United States Patent [19]
Demaree et al.

[11] Patent Number: 5,387,957
[45] Date of Patent: Feb. 7, 1995

[54] SIMPLIFIED TRIGGER, SHUTTER AND FILM ADVANCE SYSTEM SUCH AS FOR USE IN A CAMERA

[76] Inventors: Michael S. Demaree, P.O. Box 262, Porterville, Calif. 93258; John E. Demaree, 1178 Hayes St., Irvine, Calif. 92770

[21] Appl. No.: 78,737

[22] Filed: Jun. 16, 1993

[51] Int. Cl.$^6$ .............................. G03B 17/42
[52] U.S. Cl. .................................. 354/204
[58] Field of Search ............... 354/204, 288, 230, 205, 354/245

[56] References Cited

U.S. PATENT DOCUMENTS

| | | | |
|---|---|---|---|
| Re. 34,168 | 1/1993 | Ohmura et al. | 354/145.1 |
| 2,464,790 | 3/1949 | Bolsey | 354/205 |
| 2,475,126 | 7/1949 | Brueske | 354/205 |
| 2,511,215 | 6/1950 | Mihalyi | 354/205 |
| 2,584,964 | 2/1952 | Jacobson | 354/205 |
| 3,009,406 | 11/1961 | Takahama | 354/205 |
| 3,153,375 | 10/1964 | Zapp | 354/205 |
| 3,592,404 | 7/1971 | Nerwin | 242/71.2 |
| 3,696,723 | 10/1972 | Ernisse | 354/205 |
| 3,906,530 | 9/1975 | Oshima | 354/206 |
| 4,602,859 | 7/1986 | Chan | 354/121 |
| 4,681,416 | 7/1987 | Raschke | 354/173.1 |
| 4,833,495 | 5/1989 | Ohmura et al. | 354/212 |
| 4,866,469 | 9/1989 | Shiba et al. | 354/202 |
| 5,223,871 | 6/1993 | Iwagaki et al. | 354/75 |

Primary Examiner—Michael L. Gellner
Assistant Examiner—Nicholas J. Tuccillo
Attorney, Agent, or Firm—Lyon & Lyon

[57] ABSTRACT

A simplified trigger, shutter and film advance system such as for use in a camera. In a preferred embodiment the system is mounted in a housing and includes a trigger with a trigger button for pressing by the operator and a trigger point for advancing the film in a film track, a shutter which is simultaneously advanced by the trigger with the film and along a shutter track, a ramp coupled to the housing which engages the trigger point and causes the film and shutter to release, a spring which is coupled to the housing and the shutter and causes the shutter to return to its original position, and a light baffle to reduce the amount of light exposed to the film when the shutter initially returns to its at rest position.

12 Claims, 5 Drawing Sheets

SIMPLIFIED TRIGGER, SHUTTER AND FILM ADVANCE SYSTEM SUCH AS FOR USE IN A CAMERA

BACKGROUND OF THE INVENTION

1. Field of the Invention

The field of the invention generally relates to cameras.

2. Description of the Related Art

Because of the popularity of photography in today's society, numerous types of cameras are available, often with relatively expensive options. Recently numerous types of single-use, or disposable, cameras have become available.

In spite of the many advances in photography, however, the manner in which cameras take pictures has changed very little since the inception of photography. Light sensitive film is enclosed in a light-proof box. When a picture is taken, light is allowed to enter the box for a controlled length of time, and that light is focused through a lens onto a part of the light sensitive film, thereby "exposing" one picture. The film is then changed either by advancing the film from a storage spool or reel to a take-up spool or reel if the film is a continuous roll, or by removing the exposed film and replacing it with unexposed film if the film is "plate" type film. The process can then be repeated.

The many innovations to this process include advanced film winders, focus and aperture controls, and improvements in flash technology. The list of innovations is almost endless. All these innovations, however, rely upon making the basic photographing mechanism more complex, and in most cases more expensive. In light of the above, there is a need for a simplified camera design to reduce the cost of cameras, for greater ease of manufacture, and greater simplification of operation and ease of use.

Additionally, with the development of the single-use cameras, there has been an increase in the convenience of cameras to tourists, camera novices and other members of general public. Such single-use cameras, however, are often merely a plastic version of the same general design found in more expensive reusable cameras. The least expensive single-use cameras still commonly use twenty two parts or more. With so many parts, the cost of manufacture of even the least expensive single-use camera remains relatively high.

Accordingly, there is a need for a single-use camera with a simplified shutter and film-advance system which minimizes the number of parts required and thereby reduces the cost of manufacture, and which further simplifies the operation of a basic camera.

SUMMARY OF INVENTION

The present invention is directed to a camera and method for exposing film in cameras using a trigger, shutter and film advance system. The apparatus and method simplify the photographing process.

In a separate aspect of the present invention, a camera employs a trigger system which simultaneously advances the film and shutter and allows the shutter to expose the film when the shutter returns to its first position.

In another separate aspect of the present invention, a camera contains a film track for storage and advancement of the film.

In a further separate aspect of the present invention, a camera contains a special baffle which creates a vignette by restricting the amount of light designed to reach the shutter and film when the shutter begins to return to its first position.

Accordingly, it is an object of the present invention to provide an improved apparatus and method for exposing film. Other objects and advantages will appear hereinafter.

BRIEF DESCRIPTION OF THE PREFERRED EMBODIMENT

The preferred embodiment will now be described with respect to the drawings. Like elements appearing in multiple figures are similarly numbered.

Figure 1:
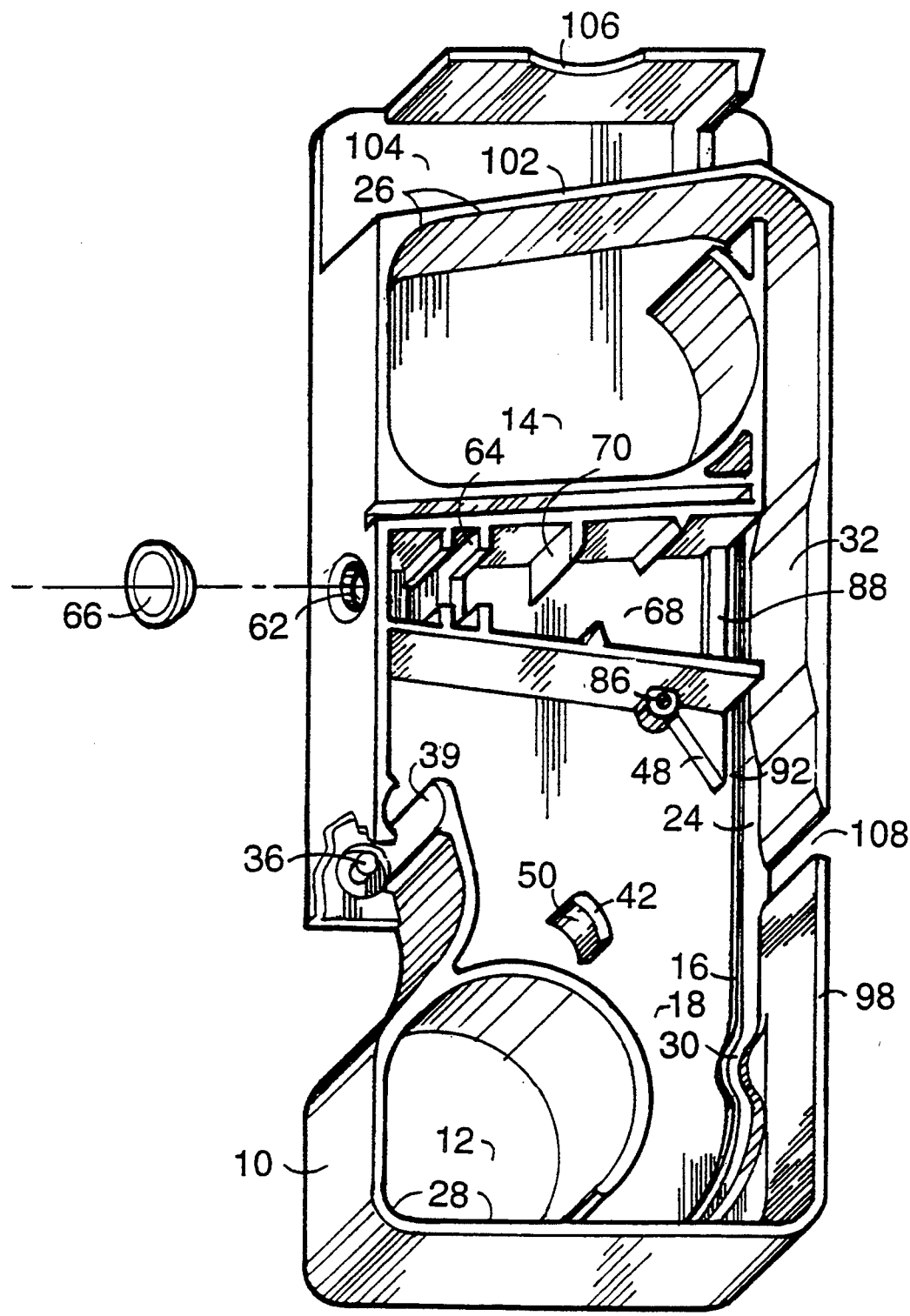
FIG. 1 is a perspective view of the case with lens.
Figure 2:
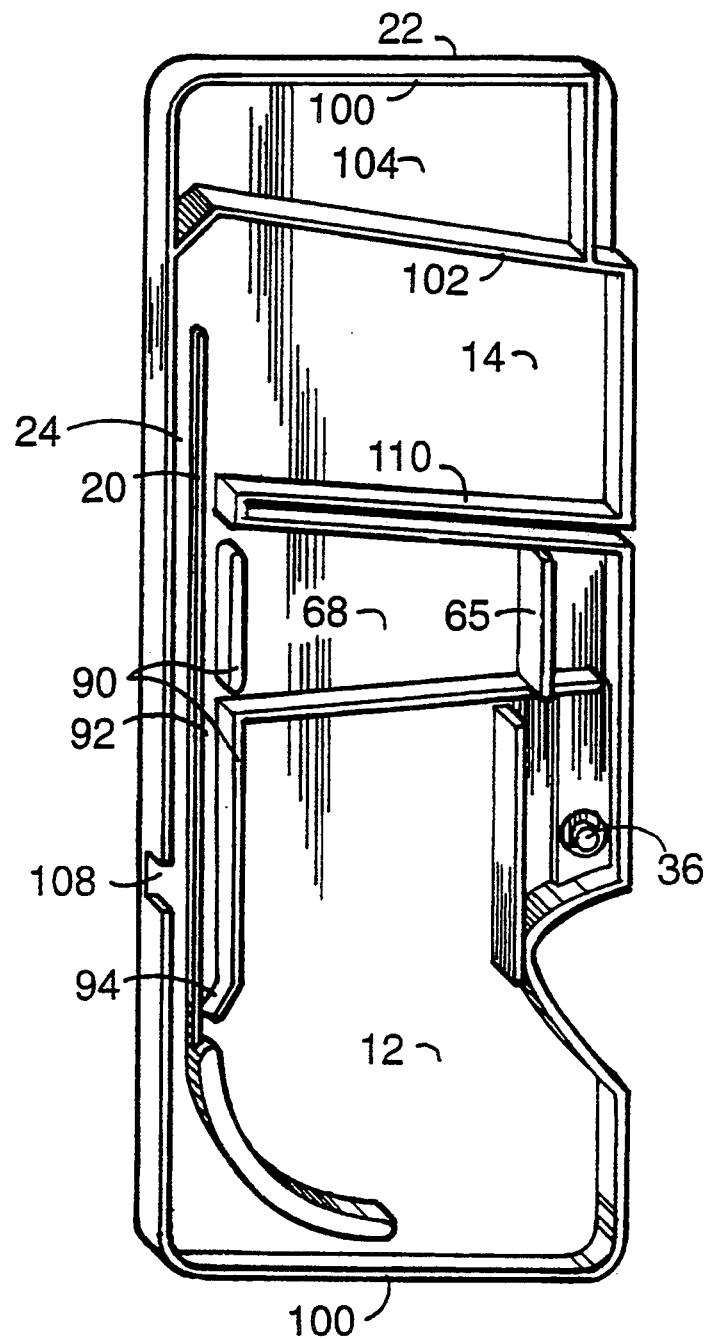
FIG. 2 is a bottom perspective view of the lid.
Figure 3:
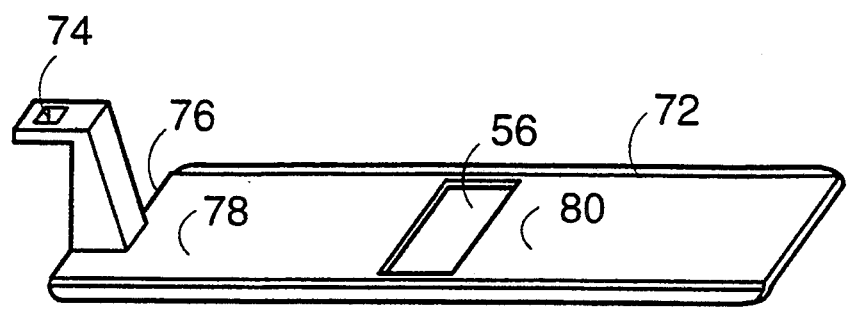
FIG. 3 is a perspective view of the shutter.
Figure 8:
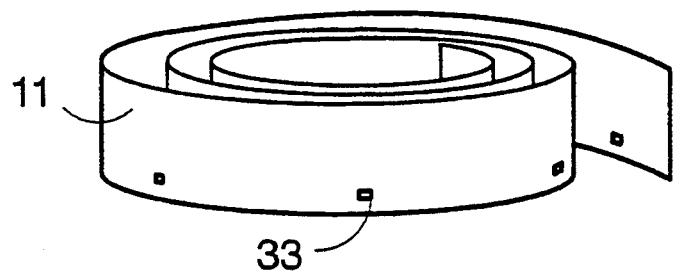
FIG. 8 is a perspective view of the film.

Referring now to FIGS. 1, 2 and 8, the case 10 is a one-piece housing comprised of any suitable material which is both durable, opaque and inexpensive such as plastic. The case 10 has two areas 12 and 14 for storage of the film 11. A first area 12 is suitable for storing and dispensing the film 11 before exposure and the second area 14 is suitable for receiving and storing the film 11 after exposure. There is a small lip 16 on the floor 18 of the case 10, and a matching lip 20 on the lid 22 running between storage areas 12 and 14, creating a film track 24 along which the film 11 may be moved. The case 10 and lid 22 form the housing for the camera and its interior parts.

The storage areas 12 and 14 have certain curved and straight segments 26 and 28 which allow the film to be pushed rather than pulled into the storage area, either when the film 11 is first loaded into the camera or after it is exposed. Straight and curved segments 26 and 28 reduce friction between the film 11 and the case 10 and facilitate the movement of the film 11 into area 12 during film loading and into area 14 during film advance. Storage areas 12 and 14 eliminate the need for spools, axles, spindles or other devices to advance the film 11 into storage area 14.

The film track 24 contains an "S" curve, or bend 30, which prevents unwanted movement of the film 11 when it is in a relaxed position after having been purposefully moved. This bend 30 prevents movement by creating friction of a known value between the film 11 and the film track 24 at an appropriate spot. The bend 30 preferably creates sufficient friction through bending the film 11, yet not so much friction to damage the film 11 as it moves along the film track 24 and through the bend 30. The film track 24 and bend 30 help prevent unwanted movement of the film 11.

The focal plane platform 32 is formed at the wall of the case 10 and is a raised area which reverses the bend in the film 11, causing the film 11 to lie flat against the focal plane platform 32.

Referring now to FIGS. 1, 2, 4, 5, 8 and 9A–D the trigger 34 may be a one piece part which may be made of plastic which passes through the case 10 at, and pivots upon, a light-proof pintle 36 and gudgeon 37 arrangement enclosed within a light-proof barrel or sheath 39. The pintle 36 is preferably located on the case 10 and lid 22, and the gudgeon 37 is preferably part of the trigger 34.

The trigger 34 is initially at an at-rest (FIG. 9A) position. The trigger 34 may be activated by pressing on the trigger button 38 which protrudes from the case 10, causing the portion of the trigger 34 inside the case to swing (FIGS. 9B and 9C) in an arc. At the time of assembly, the trigger catch 40 is placed behind an angled stop 42 on the case 10. The trigger catch 40 acts like a spring to return the trigger 34 to its original at-rest (FIG. 9A) position after the trigger button 38 is released.

Figure 5:
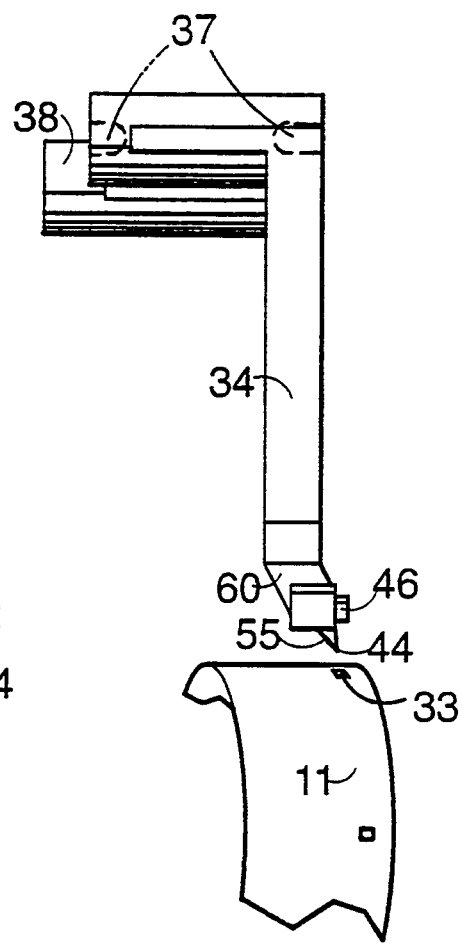
FIG. 5 is a side view of the trigger and film.
Figure 6:
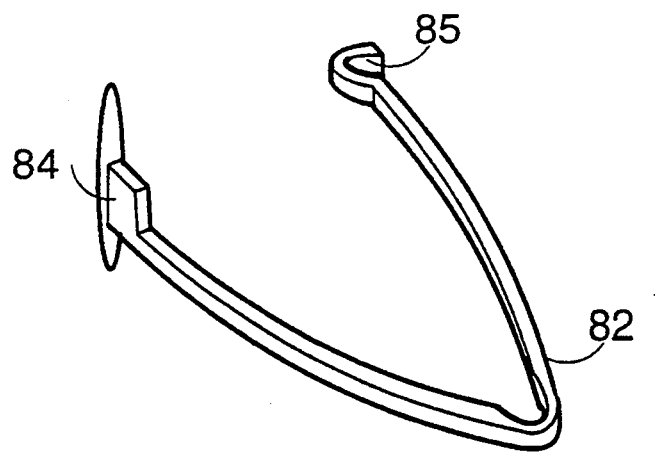
FIG. 6 is a perspective view of the spring.
Figure 7:
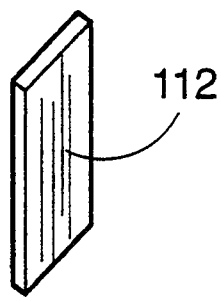
FIG. 7 is a perspective view of the secondary lid.
Figure 9A:
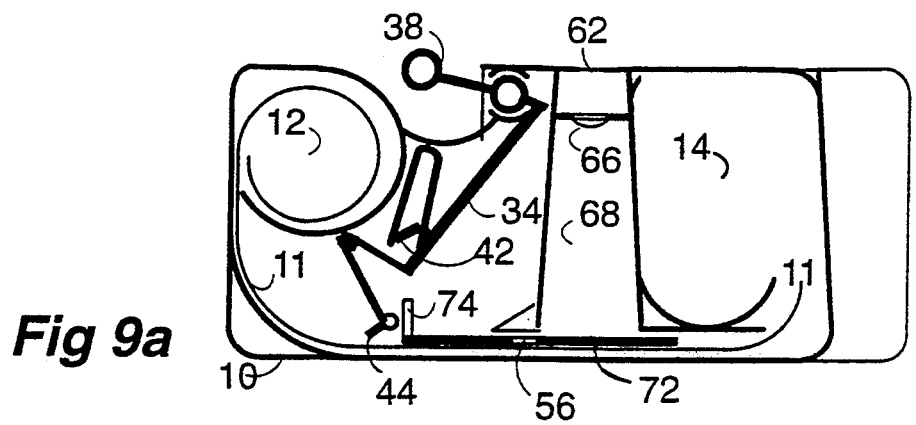
FIGS. 9A–D are a four-part, top view stop action sequence of the camera, trigger and shutter.

The trigger point 44, located at the furthest end of the interior part of the trigger 34, is that part which moves the film 11 in the film track 24. When the trigger 34 is at-rest (FIG. 9A), the trigger point 44 is poised above the film 11 in line with the sprocket holes 33 in the film 11, as shown in FIG. 9A and FIG. 5. As the trigger button 38 is pressed and the trigger 34 and the trigger point 44 begin to move in an arc, the trigger point 44 drops into the first available film sprocket hole 33 thus engaging and forming a positive link with the film 11. As the trigger button 38 continues to be pressed (FIG. 9B), the internal portion of the trigger 34 continues in an arc, advancing the film 11 from the unexposed film storage area 12, along the film track 24, and into the exposed film storage area 14.

As the internal part of the trigger 34 approaches the end of its available arc (FIG. 9C), a projection 46 on the trigger 34 engages an angled ramp 48 which may be part of the case 10. As the trigger 34 continues its arc, the projection 46 rides up the angled ramp 48, lifting the trigger point 44 out of the sprocket hole 33 in the film 11, and causing the film 11 to stop moving at a predetermined point.

When the trigger button 38 is released by the operator after being fully pressed, the trigger 34 reverses its arc, allowing the trigger point 44 to reverse its travel and slide back to the at-rest position, with the trigger point 44 once again poised above the film 11 and in line with the next sprocket hole 33 (FIGS. 9A and 5).

Figure 4:
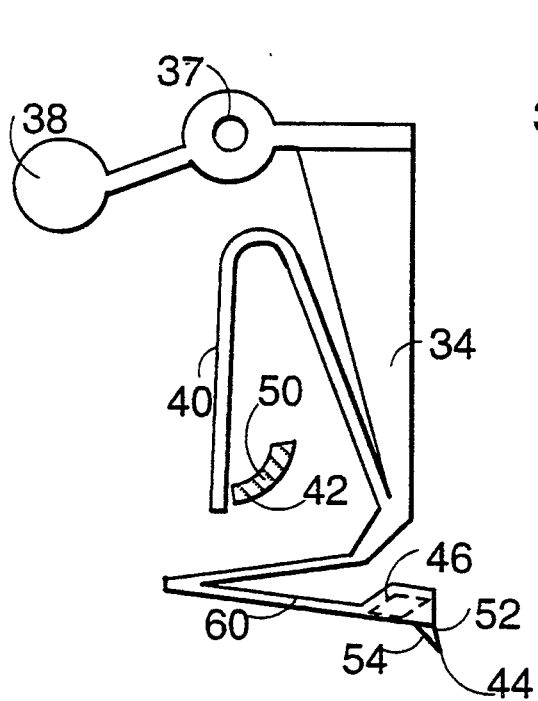
FIG. 4 is a top view of the trigger.

Referring now to FIGS. 1, 4 and 5, the angled stop 42 which is molded into the case 10, and behind which the trigger catch 40 of the molded plastic trigger 34 is placed, has been molded with a specific angle shape 50. The angle shape 50 allows the trigger catch 40 to move on the angled stop 42, thereby compensating for the spring quality of the plastic or other suitable material used. The angled stop 42 has an angle shape 50 that allows the trigger catch 40 to have a controlled and even spring tension throughout the travel of the trigger 34 through its arc of motion. The angle shape 50 is preferably designed to allow the trigger catch 40 to maintain a relatively constant tension, or flex, while the trigger 34 is traveling through its arc.

The trigger point leading face 52 is molded at an angle so that once the trigger point 44 has engaged the sprocket hole 33, the trigger point 44 can be lifted out of the sprocket hole 33 without catching on the edge of sprocket hole 33 which would cause undesired movement of the film 11. The trigger point following face 54 is also molded at an angle that allows the trigger point 44 to return to the at-rest position without interference from the film 11, and sprocket holes 33 or any other obstacle.

Referring now to FIGS. 1, 3, 4, 5 and 9A–9D, the trigger point interior face 55 is molded at an angle that creates a true point as close to the floor 18 of the case as possible, thereby preventing the trigger point 44 from inadvertently dropping into and catching on the shutter opening 56, thereby allowing the trigger 34 to fully return to its at-rest position.

The trigger arm 60 leading to the trigger point 44 is molded in such a way that it acts as a spring to press the trigger point 44 towards the film 11, and to allow the trigger point 44 to travel (FIGS. 9A and 9B) in a line along the flat film track 24 rather than in an arc as the interior portion of the trigger 34 is traveling. The trigger arm 60 also acts to press the trigger projection 46 towards the case 10 so that the projection 46 will positively engage (FIG. 9C) the ramp 48.

The trigger projection 46 is molded at such an angle that it engages the ramp 48 at a low angle of attack so it does not get caught on the ramp 48 or present an abrupt change in movement of the trigger 34. As the trigger 34 rotates through its arc, the ramp 48, with an increasing angle, lifts (FIG. 9C) the trigger point 44 as high as possible in the length of arc available.

The ramp 48 is molded at such an angle that the projection 46 can easily engage the ramp 48, and then the angle increases so the trigger point 44 will be sufficiently raised to completely clear the film 11 and any other moving parts by the end of the travel arc (FIG. 9D) of trigger point 44.

Referring now to FIGS. 1 and 2, there is an aperture 62 in one side of the case. Just inside that aperture is a lens receptacle 64 in which the lens 66 is mounted. The lens 66 is preferably a one-piece injection molded lens, molded to focus light entering the aperture onto the film 11 located at the focal plane platform 32. The lens receptacle 64, and the receptacle closure 65 in the lid 22, form a complete light block, so that any light entering the aperture 62 must pass through the lens 66. As light passes through the lens 66 it is contained in the light box 68 area of the case 10 and the lid 22. The light box 68 prevents the light from entering any other part of the camera other than to shine on the focal plane platform 32 at the farthest end of the light box 68. The lens receptacle 64 may be molded in such a way that the lens 66 can be easily pressed into place and the lens receptacle 64 holds the lens 66 in the correct position for focus, without movement and without sufficient force to distort the lens 66.

There is a light baffle 70, creating a vignette, molded into the side of the light box 68 in the case 10. The light baffle 70 is designed to slightly reduce the amount of light reaching one edge of the film to be exposed, thereby compensating for the initial inertia and resulting slower speed of the shutter 72 at the beginning of the movement of the shutter 72 across the focal plane platform 32 to expose a picture on the film 11.

Figure 9B:
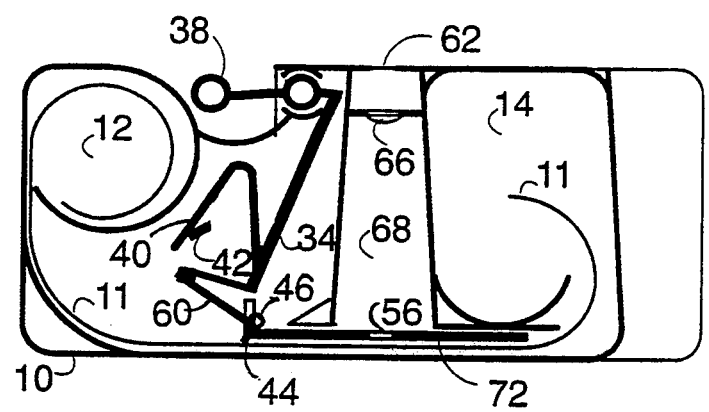
Figure 9C:
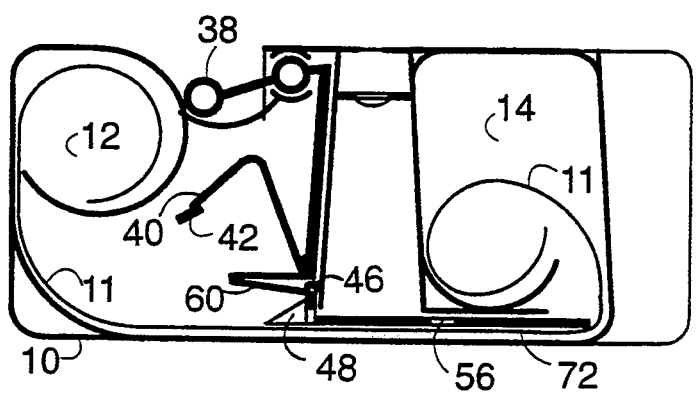

Referring now to FIGS. 1, 3, 6 and 9A–D, the shutter 72 is a one piece plastic part which in the preferred embodiment serves two functions: to prevent light from reaching the film 11, and to allow light to reach the film 11 when a picture is taken. In the preferred embodiment the shutter 72 has at-rest (FIG. 9A) and extended (FIG. 9C) positions. The extended position is achieved when the trigger 34 has nearly travelled to its extended position. The shutter 72 returns to its at-rest position through the use of the spring 82. The shutter 72 is basically a flat rectangular panel with a rectangular opening 56 in its center, and a hook-eye 74 at one end, and a push-plate 76 next to the hook-eye 74. The shutter 72 is as wide as the film 11 being used. The shutter 72 has two flat panel areas 78 and 80. Each of the flat panel areas 78 and 80 on the sides of the opening 56 is preferably as long as the film required for one "exposure". When the shutter 72 is at rest, flat panel 80 covers that portion of the film 11 which is on the focal plane platform 32 at the end of the light box 68, preventing it from being exposed. When the shutter 72 is at rest (FIG. 9A), the shutter opening 56 is outside the light box 68. As the trigger button 38 is pressed and the trigger point 44 advances the film 11, the leading face 52 of the trigger point 44 on the trigger 34 also nearly simultaneously presses against the push-plate 76 and slides the shutter 72 across the area in front of the focal plane platform 32 of the light box 68 (FIG. 9B). The film 11 and the shutter 72, both being moved by the leading face 52 of the trigger point 44 and move at the same speed across the light box 68. As the shutter 72 and film 11 move together across the light box 68, the light in the light box 68 which shines on the shutter opening 56 over-exposes a part of the film 11 which will be between two pictures and is preferably not used. As the trigger point 44 which is pushing the film 11 and the shutter 72 across the light box 68 approaches the end of its arc, the shutter 72 achieves its most extreme position (FIG. 9C). In this extreme position, the shutter opening 56 is outside the light box 68 on the opposite side from its at-rest position, and the other flat panel 78 of the shutter 72 is protecting from exposure that part of the film 11 that is intended to be exposed for a picture in this sequence.

Figure 9D:
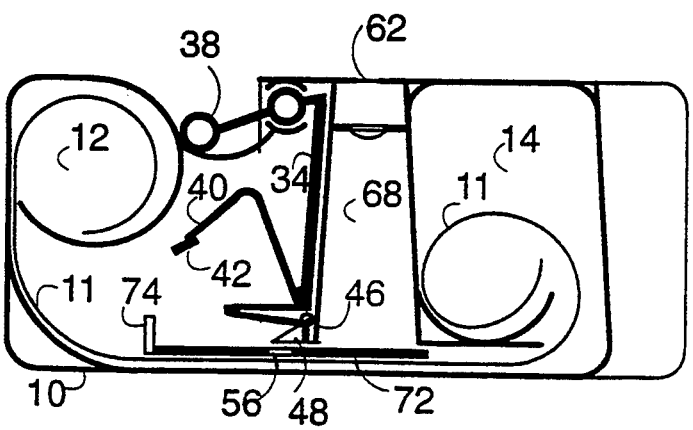

As the projection 46 strikes the ramp 48 and rides up, the trigger point 44 lifts free of the film sprocket hole 33, and the film 11 stops advancing. As the trigger point 44 continues to rise, it also releases the shutter 72, which is spring loaded with shutter spring 82. As the shutter spring 82 returns the shutter 72 towards its at rest position, the shutter opening 56 passes over the area of the focal plane platform 32 and film 11, exposing one picture. When the shutter 72 is again at-rest, the shutter panel area 80 again covers the exposed film picture, preventing further exposure of the film 11 (FIG. 9D). The shutter speed and resulting exposure time of the film 11 is determined by, among other things, the size and weight of the shutter 72, the size of the rectangular opening 56, and the tension provided by shutter spring 82.

A single press of the trigger 34 spring loads the shutter 72, advances the film 11, and releases the shutter 72 to expose one picture. This accomplishes an auto-wind feature eliminating the possibility of double exposures.

The push-plate 76 is molded at a specific angle so that as the trigger point 44 lifts out of the film sprocket hole 33 and the film 11 stops moving, the shutter 72 is also able to stop moving because the specific angle molded into the push-plate 76 allows the trigger point 44 to continue in its movement up the ramp and forward through the arc of the interior trigger 34 without further advancing the shutter 72.

The shutter opening 56 is molded in such a way to prevent the trigger point 44 from hanging-up on or dropping into the shutter opening 56 when it returns to the at-rest position.

Referring now to FIGS. 9A-D, the trigger 34 and shutter 72 are shown as they are assembled inside the case 10. In FIG. 9A, the trigger 34 and shutter 72 are in their at-rest position. In FIG. 9B, the trigger 34 is advancing the shutter 72 and film 11. In FIG. 9C, the trigger projection 46 has engaged and ridden up the angled ramp 48, and the film 11 and shutter 72 have reached their extreme position for an exposure sequence. In FIG. 9D, the trigger point 44 has finished its arc and the trigger protection 46 has completed its travel up the ramp 48 releasing the shutter 72 which has returned to its original at-rest position after being released by the trigger point 44. The trigger button 38 is then released allowing the trigger 34 to return to its at-rest position as shown in FIG. 9A, while the film 11 remains in its advanced position for the next sequence.

Referring now to FIGS. 3, 4, 5, 6 and 9A-D, the shutter spring 82 may be a one piece plastic spring, one end 84 of which is inserted into a spring receptacle 86 in the case 10, and the other end 85 of which is hooked into the hook-eye 74 on the shutter 72 at the time of camera assembly. A purpose of the shutter spring 82 is to expose one picture when the shutter 72 is released by the trigger point 44 by moving the shutter 72 at constant known speed across the area of the focal plane platform 32 and film 11 from the extreme position (FIG. 9C) of the shutter 72 back to its at-rest position (FIG. 9A).

Referring now to FIGS. 1, 2, 7 and 9A-D, the case 10 and lid 22 both have short lips 88 and 16 in the case 10, and short lips 90 and 20 in the lid 22, which create a shutter track 92 parallel to the film track 24, and separates the film 11 from the shutter 72. The edges of the shutter 72 ride in the shutter track 92 with minimum and predictable friction.

The at-rest end of the short lip 90 in the lid 22 which forms the shutter track 92 is molded at such an angle as to form a shunt 94 which re-directs the momentum of the returning shutter 72, allowing the shutter 72 to immediately stop in the at-rest position, without bounce or shudder.

The upper lip 98, of the case 10 is molded in a "U" shape (not shown) to receive the lip 100 of the lid 22 in such a way as to prevent the entrance of light into the Camera. One end of the case 10 and the lid 22 is walled off 102 and light sealed to form a view-finder 104 for the camera.

A slot 106 is molded into the case 10 in the side by the view-finder 104 to facilitate the removal of the lid 22 for the removal of film 11.

The lid 22 is molded in such a way as to allow the part of lid 22 which covers the storage area 14 and the view-finder 104 to bend or break along a light box wall 110 beside the light box 68, so that when the camera is being unloaded in a light-safe environment, the technician can simply place a thumb or other suitable device in the slot 106 on the case 10 and push the lip 100 above the thumb slot 106 upwards, rendering the exposed film storage area 14 accessible for easy film removal.

The film loading slot 108 at the back of the case 10 and lid 22 is used to push film 11 into the camera after the camera is fully assembled. After the film 11 is in the film storage area 12, the slot 108 is covered with a light proof secondary lid 112.

Because the film is simply pushed into the camera's film storage area 12, no spools, spindles or film cartridges or other devices are needed to hold the film 11 in the camera.

Thus a camera with a simplified trigger, shutter and film advance system having a reduced number of parts has been shown and described. Though certain examples and advantages have been disclosed, further advantages and modifications may become obvious to those skilled in the art from the disclosure herein. The current invention, therefore, is not to be limited except in the spirit of the claims that follow.

What is claimed:

1. A camera using film, comprising
a housing defining a track for receiving the film having consecutive first, second and third positions;
a shutter slidable in said housing adjacent said track and having a push plate;
a trigger movably mounted in said housing including an arm constructed and arranged with said housing to advance from said first position, through said second position, to said third position, said arm extending to engage the push plate and a sprocket hole in the film at said first position, releasing the sprocket hole at said second position, and disengaging the push plate at said third position.

2. The camera of claim 1, further comprising
a spring coupled to said housing and to said shutter, and adapted to return said shutter to said first position.

3. The camera of claim 1, further comprising
a first and second guide in said film track,
a raised platform in said film track extending to between said first and second guides.

4. The camera of claim 3, further comprising
said guides and said platform defining said film track such that the film is held against said platform.

5. The camera of claim 1, further comprising
a bend in said film track.

6. The camera of claim 1, further comprising
a lens located in said housing;
a light baffle located between said lens and said shutter adjacent said second position.

7. The camera of claim 1, further comprising a ramp adapted to engage said arm thereby releasing said film and said shutter.

8. A camera using film, comprising
a housing including an aperture and lens, an initial storage area where unexposed film is stored, and a second storage area for receiving film at least part of which has been exposed;
a film track;
a shutter slidable in said housing between an original position and an advanced position, adjacent to said film track;
a spring fixedly coupled to said housing and movably coupled to said shutter, and adapted to return said shutter to an original position;
a trigger movably mounted in said housing including a trigger button which protrudes from the housing for pressing by the operator, a trigger point to engage and advance the film and said shutter;
a ramp fixedly coupled to the housing which engages said trigger to cause the trigger point to disengage the film and said shutter;
wherein upon the operator pressing the trigger button, the trigger point advances the film and said shutter until said trigger engages said ramp at which time said shutter returns to its original position thereby exposing the film.

9. A method for exposing film comprising the steps of
advancing a shutter in a shutter track from a first position, through a second position, to a third position using a substantially unitary trigger;
advancing film in a film track adjacent the shutter track nearly simultaneously with said step of advancing the shutter using the trigger;
releasing the film from the trigger at the second position;
disengaging the shutter from the trigger at the third position.

10. A camera using film comprising
a housing defining a track for receiving the film having consecutive first, second and third positions;
a shutter slidable in said housing along said track and having a push plate;
a substantially unitary trigger movably mounted in said housing having an arm constructed and arranged with said housing to advance from said first position, through said second position, to said third position, said arm extending to engage the push plate and a sprocket hole in the film at said first position, releasing the sprocket hole at said second position, and releasing the push plate at said third position, at which time the shutter returns to said first position thereby exposing the film.

11. The camera of claim 10, further comprising
a ramp adapted to engage said arm.

12. The method of claim 9 further comprising the step of
returning the shutter from the third position to the first position thereby exposing the film.

* * * * *